United States Patent
Godry

(10) Patent No.: US 8,991,480 B2
(45) Date of Patent: Mar. 31, 2015

(54) FABRICATION METHOD FOR MAKING BRAZED HEAT EXCHANGER WITH ENHANCED PARTING SHEETS

(75) Inventor: Thomas J. Godry, Kenmore, NY (US)

(73) Assignee: UOP LLC, Des Plaines, IL (US)

( * ) Notice: Subject to any disclaimer, the term of this patent is extended or adjusted under 35 U.S.C. 154(b) by 616 days.

(21) Appl. No.: 13/309,246

(22) Filed: Dec. 1, 2011

(65) Prior Publication Data

US 2012/0152507 A1 Jun. 21, 2012

Related U.S. Application Data

(60) Provisional application No. 61/423,334, filed on Dec. 15, 2010.

(51) Int. Cl.

| F28F 13/18 | (2006.01) |
|---|---|
| F28F 3/00 | (2006.01) |
| B21D 53/02 | (2006.01) |
| F28D 9/00 | (2006.01) |
| B23K 1/00 | (2006.01) |

(52) U.S. Cl.
CPC ........... *F28D 9/0068* (2013.01); *F28F 2275/04* (2013.01); *B23K 1/0012* (2013.01); *Y10S 165/907* (2013.01)
USPC ........... 165/166; 165/133; 165/907; 228/183; 228/248.1; 228/248.5; 29/890.3

(58) Field of Classification Search
CPC ............. F28F 3/00; F28F 19/00; B21D 53/02
USPC ............... 165/133, 166, 907; 228/183, 248.1, 228/248.5; 29/890.3
See application file for complete search history.

(56) References Cited

U.S. PATENT DOCUMENTS

| 2,671,958 A | 3/1954 | Block |
| 3,384,154 A | 5/1968 | Milton |
| 3,457,990 A | 7/1969 | Theophilos |
| 4,258,783 A | 3/1981 | Albertson |
| 4,653,572 A | 3/1987 | Bennett |

(Continued)

FOREIGN PATENT DOCUMENTS

| CN | 8610487 | 9/1987 |
| EP | 112782 A1 | 12/1983 |

(Continued)

OTHER PUBLICATIONS

Robertson, Boiling Heat Transfer with Freon 11 (R11) in Brazed Aluminum, Plate-Fin Heat Exchangers, Journal of Heat Transfer, vol. 105, pp. 605-610, Aug. 1983, American Society of Mechanical Engineers.

(Continued)

*Primary Examiner* — Frantz Jules
*Assistant Examiner* — Erik Mendoza-Wilkenfel

(57) ABSTRACT

Disclosed is a heat exchanger comprising a boiling passage and cooling passage defined by opposite sides of metal walls. Layers of brazing material between the metal walls and a spacer member bond components of the heat exchanger together. It has been found that good quality brazed joints can be made by modifying the brazing thermal cycle to first employing a temperature of about 500° C. for an extended period of time and then elevating the temperature to about 590° to 600° C.

11 Claims, 3 Drawing Sheets

(56) References Cited

U.S. PATENT DOCUMENTS

| | | | |
|---|---|---|---|
| 4,700,771 | A | 10/1987 | Bennett |
| 4,715,431 | A | 12/1987 | Schwarz |
| 4,715,433 | A | 12/1987 | Schwarz |
| 4,767,497 | A | 8/1988 | Shattes |
| 4,846,267 | A | 7/1989 | Shattes |
| 5,257,731 | A * | 11/1993 | Nonoyama et al. ........... 228/217 |
| 5,322,209 | A | 6/1994 | Barten |
| 5,699,671 | A | 12/1997 | Lockett |
| 5,868,199 | A | 2/1999 | Lavin |
| 6,325,276 | B1 | 12/2001 | Kawano |
| 6,393,866 | B1 | 5/2002 | Srinivasan |
| 7,677,300 | B2 | 3/2010 | O'Neill |
| 8,123,109 | B2 | 2/2012 | O'Neill |
| 2007/0028649 | A1 | 2/2007 | Chakravarthy |
| 2008/0041573 | A1* | 2/2008 | O'Neill et al. ................. 165/166 |
| 2009/0320291 | A1 | 12/2009 | O'Neill |
| 2010/0206529 | A1* | 8/2010 | Ogilvy et al. ................. 165/148 |
| 2011/0139417 | A1 | 6/2011 | Godry |

FOREIGN PATENT DOCUMENTS

| | | |
|---|---|---|
| EP | 303493 A1 | 11/1988 |
| GB | 2034355 A | 11/1978 |
| GB | 2062207 A | 9/1980 |
| JP | S59150661 | 8/1984 |
| JP | 2007-167580 A | 7/1995 |
| JP | 200138463 A | 2/2001 |
| JP | 2006-220319 A | 8/2006 |
| JP | 2009-030891 A | 2/2009 |

OTHER PUBLICATIONS

Robertson, Boiling Heat Transfer with Liquid Nitrogen in Brazed-Aluminum Plate-Fin Heat Exchangers, The American Institute of Chemical Engineers, 1979, San Diego, CA, AICHE Symposium Series, vol. 75, No. 189, pp. 151-164.

Suslov, Vacuum Brazing of Aluminum-Alloy Heat Exchangers, Soviet Engineering Research, vol. 70, No. 5., 1990, pp. 29-30.

Yoon, Fabrication of Automotive Heat Exchanger Using Kinetic Spraying Process, Kinetic Spray Coating Laboratory (NRL), Division of Materials Science and Engineering, Hanyang University, Korea, Surface and Coatings Technology, vol. 201, Oct. 15, 2007; pp. 9524-9532, Publisher: Elsevier B.V.

Caplan, High-Temperature Brazing of Aluminum Bronze to Inconel, Welding Research Supplement, Welding Journal, vol. 36, No. 10, Oct. 1957, pp. 457s-464s, Publisher: American Welding Society.

Kanda, Studies of Aluminum Brazing by Low Oxygen Atmosphere Furnace, Keikinzoku Yosetsu/Journal of Light Metal Welding and Construction, vol. 45, No. 9, Sep. 2007, pp. 431-437, Publisher: Japan Light Metal Welding and Construction Association (Japanese with English abstract).

Winterbottom, Vacuum Brazing of Aluminum: Auger Studies of Wetting and Flow Characteristics, Journal of Vacuum Science and Technology, vol. 13, No. 2, Mar.-Apr. 1976, pp. 634-643.

* cited by examiner

FABRICATION METHOD FOR MAKING BRAZED HEAT EXCHANGER WITH ENHANCED PARTING SHEETS

CROSS-REFERENCE TO RELATED APPLICATION

This application claims priority from Provisional Application No. 61/423,334 filed Dec. 15, 2010, the contents of which are hereby incorporated by reference.

FIELD OF THE INVENTION

This invention relates to an improved method for making a metal heat exchanger with high heat transfer efficiency. Specifically, this invention relates to an improved method for making a brazed heat exchanger containing enhanced parting sheets.

BACKGROUND OF THE INVENTION

Two designs of heat exchanger are presently in general use for reboiler-condensers in cryogenic, refinery and chemical applications. One type of heat exchanger in current use is a vertical shell and tube heat exchanger. To achieve a sufficiently high degree of heat transfer at relatively low temperature differences with this design, enhanced boiling layers (EBL) are used. An EBL typically has a structure comprising a multitude of pores that provide boiling nucleation sites to facilitate boiling. An EBL is applied to the inside of the tubes, and longitudinal flutes are provided on the outside of the tubes to facilitate heat transfer.

Enhanced boiling layers were first proposed for heat exchangers in U.S. Pat. No. 3,384,154. This patent discloses mixing metal powder in a plastic binder in solvent and applying the slurry to a base metal surface. The coated metal is subjected to a reducing atmosphere and heated to a temperature for sufficient time so that the metal particles sinter together and to the base metal surface. U.S. Pat. No. 3,457,990 discloses an enhanced boiling surface with reentrant grooves mechanically or chemically formed therein.

Other methods of applying EBLs have been disclosed. GB 2 034 355 discloses applying an organic foam layer to a metal heat transfer member and plating the foam with metal such as copper first by electroless, then by electrodeposition. U.S. Pat. No. 4,258,783 discloses mechanically forming indentations in a heat transfer surface and then electrodepositing metal on the pitted surface. GB 2 062 207 discloses applying metal particles to a metal base by powder flame spraying. EP 303 493 discloses spraying a mixture of metal and plastic material onto a base metal by flame or plasma spraying. U.S. Pat. No. 4,767,497 and U.S. Pat. No. 4,846,267 disclose heat treating an aluminum alloy plate to produce a precipitate followed by chemically etching away the precipitate to leave a pitted surface. EP 112 782 discloses applying a mixture of brazing alloy and spherical particles to a metallic wall and heating the coated wall to melt the brazing material.

A common heat exchanger used in cryogenic, refinery and chemical applications is the plate-fin brazed aluminum heat exchanger fabricated by disposing corrugated aluminum sheets between aluminum parting sheets or walls to form a plurality of fluid passages. The sheets are either clad with an aluminum brazing layer or a layer of brazing foil is inserted between the surfaces to be bonded. When heated to a predetermined temperature for a predetermined period of time, the brazing foil or cladding melts and forms a metallurgical bond with the adjacent sheets. The resulting heat exchanger contains numerous passages consisting of alternate layers of closely spaced fins. A typical arrangement of alternate layers of passages each containing fins with a density of 6 to 10 fins/cm (15 to 25 fins/inch), and a fin height of 0.5 to 1 cm (0.2 to 0.4 inch). In a common application, a first series of alternating passages carry vapor for condensing, while a second series of alternating passages carry a liquid for boiling. Typical brazed aluminum heat exchangers must be able to withstand 2068 to 2758 kPa (300 to 400 psia).

Patents proposing replacing fins with an enhanced boiling layer in the boiling passages of a brazed heat exchanger include U.S. Pat. No. 5,868,199; U.S. Pat. No. 4,715,431 and U.S. Pat. No. 4,715,433. These patents propose to stack aluminum sheets each with an EBL applied on one side to define boiling channels and with fins on the other side of the aluminum sheets to define condensing channels. Layers of brazing material are disposed between bonding surfaces in the stack, and the stack is subjected to heating over a period of time to obtain a brazed heat exchange core. Such brazed aluminum heat exchangers described in these patents have not been commercialized because EBLs are typically brazed at 565° to 593° C. (1050° to 1100° F.) while the subsequent brazing of the metal components together occur at around 593° to 621° C. (1100° to 1150° F.). Maintaining the integrity and effectiveness of the EBL, particularly the porous structure provided by the mutually bonded metal particles, during the second hotter heat treatment to effect brazing has been difficult. This difficulty accounts for the lack of commercially available brazed heat exchangers with EBL in the boiling passages.

In U.S. Pat. No. 7,677,300, a method for making brazed heat exchangers as well as the heat exchangers were disclosed. However, In fabrication development trials conducted for the high flux brazed aluminum heat exchanger product, it was found that the initial controlled atmosphere brazing (CAB) process to apply the High Flux coating to the AA-3003 aluminum parting sheets results in the presence of some residual brazing flux of the Potassium Aluminum Fluoride (KAlFx) variety throughout the porous metal matrix metallurgically bonded to the aluminum sheet substrate. While this fact in itself is not surprising, it has been discovered that the residual brazing flux, even in relatively small amounts remaining after ultrasonic cleaning of the High Flux-coated sheets and with its relatively low vapor pressure, can have detrimental impact on the subsequent vacuum aluminum brazing (VAB) process that is routinely used for fabrication of BAHX cores using the AA-3003 parting sheets.

SUMMARY OF THE INVENTION

The present invention is an improved method for making a brazed metal heat exchanger and the resulting apparatus. An enhanced boiling layer (EBL) is provided on the walls of the boiling passages. The melting temperature of the brazing material is lower than the melting temperature of the metal particles in the enhanced boiling layer. In an embodiment, the metal in the enhanced boiling layer and/or the brazing layer is an alloy of a first metal and a second metal which alloy has a lower melting temperature than that of the first metal. Different second metals can be used in the EBL and in the brazing material so long as the second metal provides an alloy with a lower melting temperature. In an embodiment, the concentration of the second metal in the brazing material is greater than in the EBL. Hence, we have found that even when the brazing temperature gets within about 8.3 Celsius degrees (15 Fahrenheit degrees) of the melting point of the metal in the EBL for an extended period of time, the EBL unexpectedly retains its porosity, and thus its effectiveness. In an embodiment, the condensing passages contain fins to facilitate heat transfer.

Based upon the use of a modified vacuum aluminum brazing thermal cycle in which a temperature plateau at 500° C. is employed for an extended period of time to effect off-gassing of residual potassium aluminum fluoride brazing flux before elevating the work to the ultimate brazing temperature of 590° to 600° C., good quality braze joints can be obtained where poor brazing would otherwise result using a classical VAB thermal cycle due to interference of the residual potassium aluminum fluoride brazing flux off-gassing with the braze alloy in the temperature range of brazing. The fact that initiation of off-gassing at 500° C. does not begin until after a considerable period of time is spent at that temperature would not make this an obvious choice to one skilled in the art. Furthermore, the fact that the 500° C. temperature is relatively close to the melting temperature of the braze alloy used for joining the components would further discourage one skilled in the art from considering such an option

DETAILED DESCRIPTION OF THE PREFERRED EMBODIMENTS

The methods of the present invention can be used to construct any configuration of heat exchanger by brazing including shell and tube but may be most appropriately applied to plate exchangers. The boiling and cooling passages of the heat exchangers of the present invention may be oriented to provide cross flow, counter-current flow or cocurrent flow. Moreover, the heat exchanger of the present invention may be applied in the context of cryogenic air separation, hydrocarbon processing or any other process that relies on boiling to effect heat exchange. Several types of metals can be used for construction of heat exchangers. Aluminum is the most widely used metal for brazed heat exchangers. Aluminum is suitable for cryogenic applications because it resists embrittlement at lower temperatures. Steel or copper may be used for heating or cooling fluids that may be corrosive to aluminum. For purposes of illustration, the present invention will be described with respect to a counter current, aluminum, plate heat exchanger useful in the context of cryogenic air separation.

Figure 1:
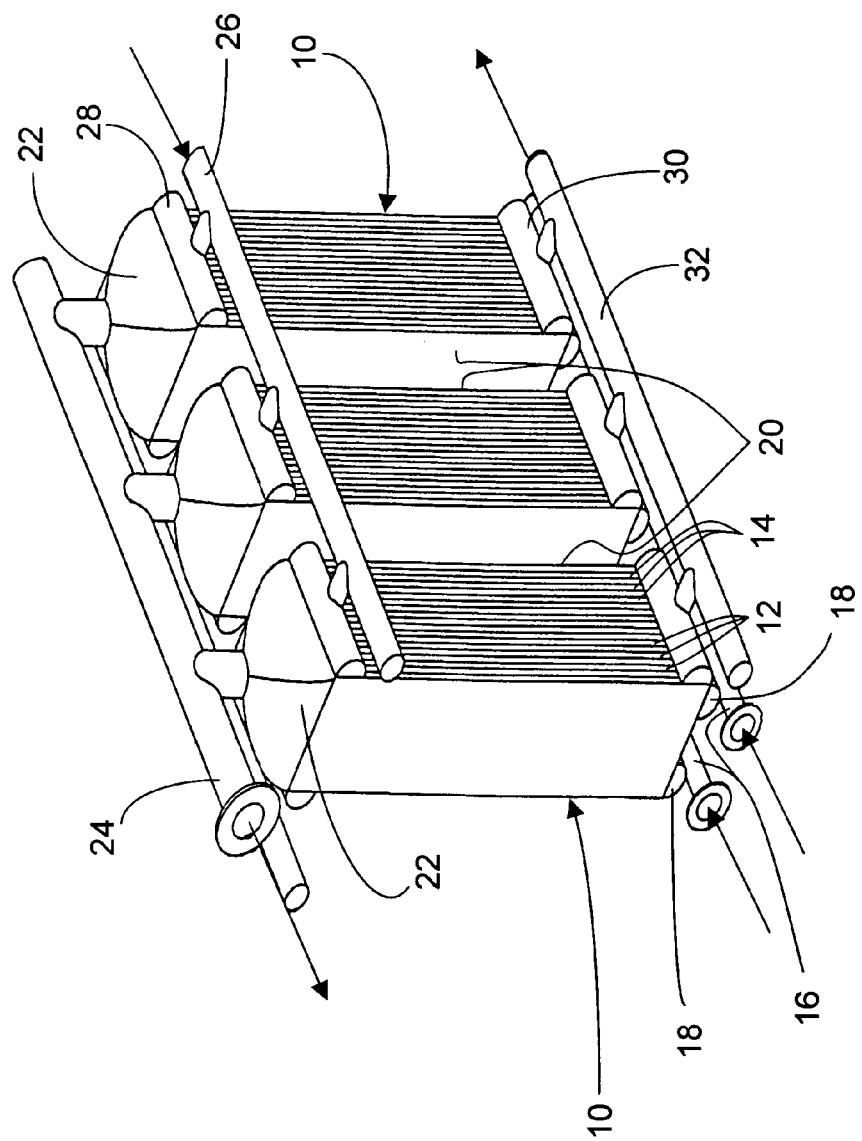
FIG. 1 is a perspective view of three heat exchangers.

FIG. 1 shows a train of typical plate heat exchangers 10 used in cryogenic air separation. The heat exchangers 10 have alternating boiling passages 12 and cooling passages 14 provided in a core 20. A liquid such as liquid oxygen is delivered by conduits 16 to manifolds 18 and distributed to the boiling passages 12. Delivery of liquid to the boiling passages 12 by means other than the conduits 16 or the manifolds 18 underneath the core 20 is contemplated such as by thermosiphoning at the bottom of the boiling passages 12. Moreover, liquid may be delivered to the boiling passages 12 from the side or from the top of the core 20, perhaps through a distribution network that may comprise distributor fins. The liquid boils in the boiling passages 12, thereby indirectly withdrawing heat conducted from the cooling passages 14. Gaseous oxygen from the boiling passages 12 are collected such as by headers 22 and removed through a conduit 24. Collection of gases from the boiling passages 12 by means other than the conduits 24 or the headers 22 above the core 20 is contemplated such as may be provided in a thermosiphoning arrangement. Moreover, gases may be collected from the boiling passages 12 from the side or from the top of the core 20, perhaps through a collection network that may comprise collection fins. A fluid such as gaseous nitrogen is delivered by conduits 26 to manifolds 28 and distributed to the cooling passages 14. Delivery by means other than by the conduits 26 or the manifolds 28 is also contemplated. A liquid or gas can be cooled in the cooling passages 14. Moreover, if a gas is delivered to the cooling passages 14, it may be cooled to such extent to effect a phase change with or without temperature change depending on the needs of the process. Heat conducted across the walls between the cooling passages 14 and the boiling passages 12 to support the boiling in the boiling passages 12 cools the fluid in the cooling passages 14, thereby condensing the nitrogen gas in the case of air separation. Fluid such as liquefied nitrogen from the cooling passages 14 is collected such as by headers 30 and removed through conduits 32. Collection of cooled fluid from the cooling passages 14 by means other than the headers 30 and the conduits 32 is contemplated. Moreover, the delivery and collection manifolds and conduits shown in the embodiment in FIG. 1 may be modified and remain within the scope of the present invention.

Figure 2:
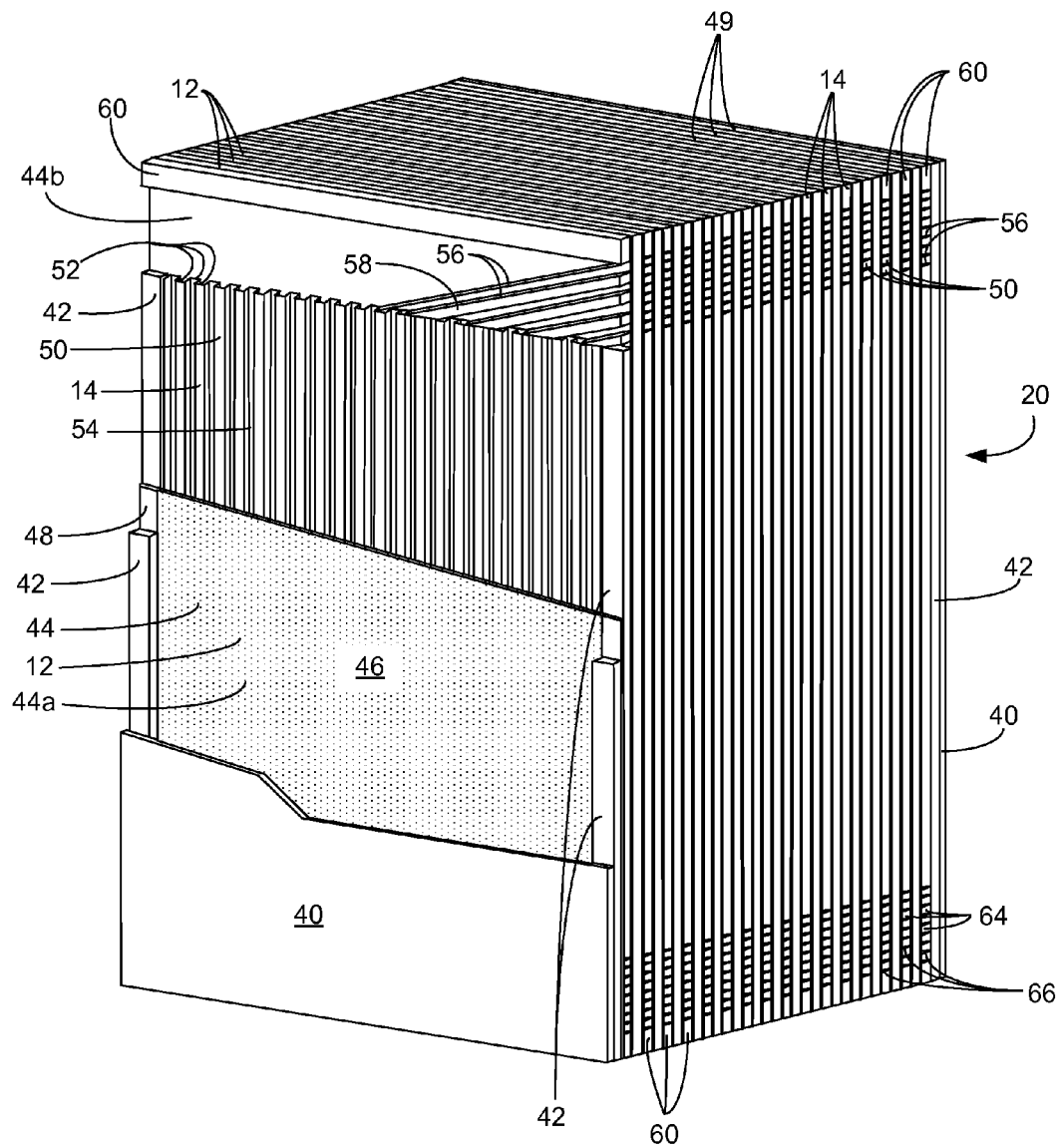
FIG. 2 is a perspective view of the core of a heat exchanger in FIG. 1 with layers broken away to reveal internals.

FIG. 2 shows the core 20 of one of the heat exchangers 10 with parts broken away to reveal internals. A cap sheet 40 is disposed on both ends of the core 20 to define the last channel on each end. Part of the cap sheet 40 illustrated in FIG. 2 is broken away to reveal the boiling passage 12. Vertical spacer bars or spacer members 42 are disposed between opposing edges of the cap sheet 40 and a metal wall 44 with a boiling side 44a covered with an enhanced boiling layer (EBL) 46. The EBL 46 comprises thermoconductive particles bonded to the boiling side 44a and to each other to form a texture of pores in which nucleate boiling sites are provided. The thermoconductive particles are metal particles in an embodiment. Hence, the boiling passage 12 is defined by an inner surface of the cap sheet 40, inner edges of the vertical spacer bars 42 and the boiling side of the metal wall 44. Outer vertical margins 48 of the boiling side 44a are devoid of the EBL 46 to provide a bonding surface. Vapor leaves the boiling passages 12 through boiling outlets 49, which may be collected by the boiling headers 22, shown in the embodiment of FIG. 1. Moreover, it is contemplated that the boiling passages 12 may contain fins to further facilitate heat transfer. Behind the broken away metal wall 44 and the vertical spacer bars 42 is the cooling passage 14 including primary fins 52 comprising a corrugated sheet of a primary fin stock 54. The primary fins 52 extend laterally between inner edges of the vertical spacer bars 42 at opposite ends of the cooling passage 14. Distributor fins 56 comprising a distributor fin stock 58 or being integral with the primary fin stock 54 are disposed in an inclined configuration to evenly distribute cooling fluid from cooling inlets 50 along the tops of the channels provided by the primary fins 52. In the embodiment of FIG. 2, cooling fluid is received into cooling inlets 50 which may come from the cooling manifold 28 as shown in the embodiment of FIG. 1. Another type of distribution configuration with or without fins may be used to distribute cooling fluid. In another embodiment, the cooling inlets 50 may be considered the tops of the channels provided by the primary fins 52. For purposes of illustrating the tops of the primary fins 52, only one set of the distributor fins 56 is shown in FIG. 2. Cooling outlets 64 which may be defined by collection fins 66 allow cooled fluid to exit the core 20. In the embodiment of FIG. 2, cooling fluid exits through cooling outlets 64 which may enter into the cooling header 30 in the embodiment of FIG. 1. Horizontal spacer bars 60 seal the top and the bottom of the cooling passages 14. The spacer bars 42, 60 and the fins 52, 56, 66 space a cooling side 44b (the opposite side) of the metal wall 44 from the cooling side 44b of the adjacent metal wall 44. In an embodiment, no horizontal spacer bars 60 are provided in the boiling passages 12 to permit entry and exit of fluid to and from the boiling passages 12, respectively. Hence, the vertical spacer bars 42 are sandwiched between opposite ends of each pair of the adjacent metal walls 44, while the horizontal spacer bars 60 are sandwiched only between the adjacent cooling sides 44b. However, if the fins 52, 56, 66 are arranged and bonded appropriately to withstand operating pressure, it is contemplated that spacer bars 42, 60 can be omitted between the cooling sides 44b in the cooling passage 14. Hence, the fins 52, 56, 66 would provide the spacing function. The walls 44 have an alternating orientation. Except when adjacent to the cap sheet 40, the cooling side 44b of the metal wall 44 is always facing the cooling side 44b of an adjacent wall, and the boiling side 44a of a wall is always facing the boiling side 44a of the adjacent metal wall 44. It is also contemplated in embodiments that the cooling passages 14 include no fins and that the boiling passages 12 be equipped with fins.

Figure 3:
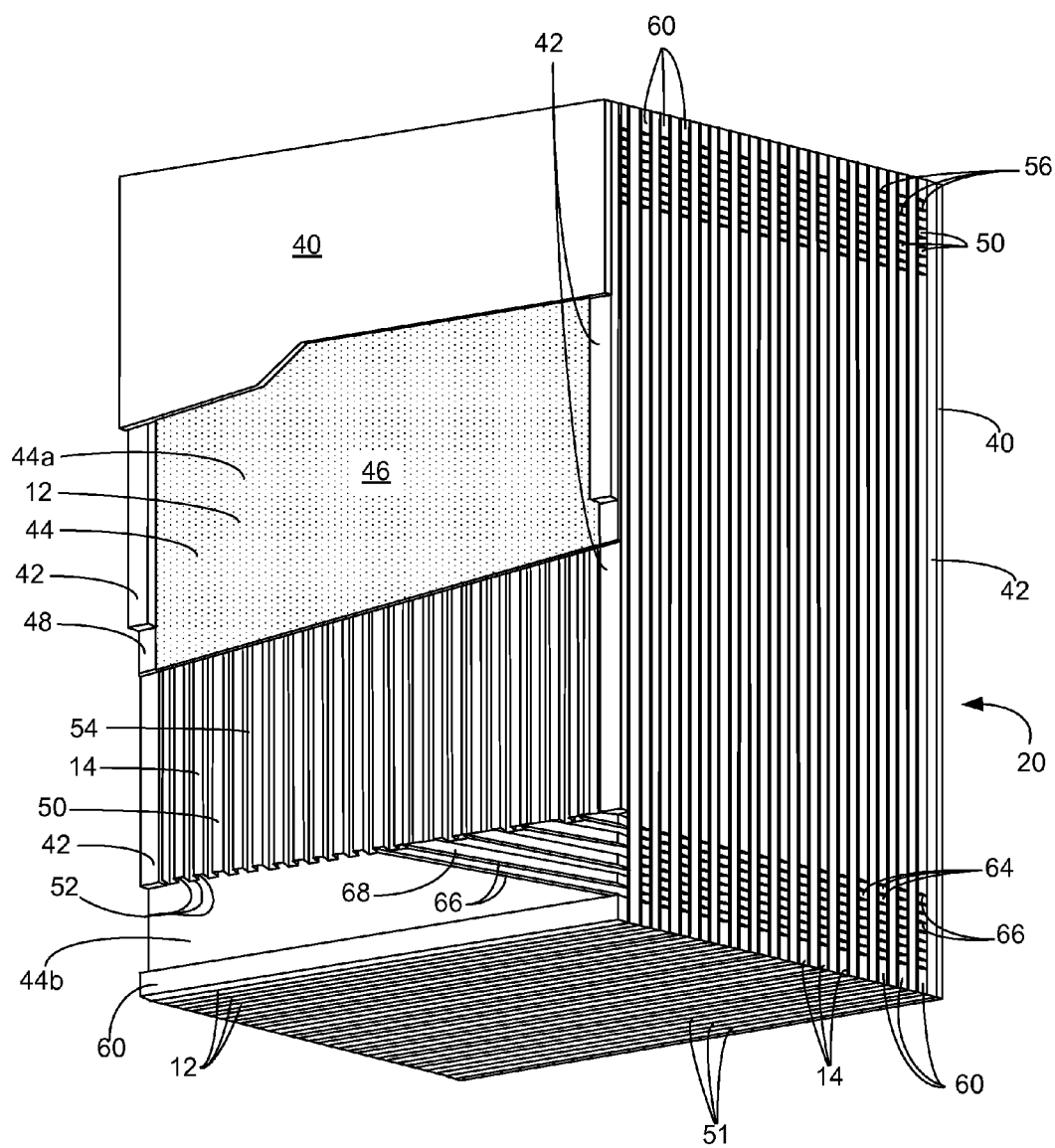
FIG. 3 is a perspective view of the core of the heat exchanger in FIG. 1 but taken from a different perspective than FIG. 2.

FIG. 3 shows the core 20 of FIG. 2 but from a perspective that shows the bottom of the core 20. All elements in FIG. 2 that are visible in FIG. 3 are referenced with numerals. Additionally, boiling inlets 51 to the boiling passages 12 are shown. In an embodiment, the boiling inlets 51 may receive boiling liquid from boiling manifolds 18 (FIG. 1). Moreover, the bottom of the cap sheet 40 and the first metal wall 44 are broken away to reveal collection fins 66 from a third fin stock 68. The collection fins 66 comprising the third fin stock 68 or being integral with the primary fin stock 54 are disposed in an inclined configuration to evenly collect cooling fluid from cooling outlets 64 along the bottoms of the channels provided by the primary fins 52. Another type of collection configuration with or without fins may be used to collect cooling fluid. In another embodiment, the cooling outlets 64 may be considered the bottoms of the channels provided by the primary fins 52. For purposes of illustrating the bottoms of the primary fins 52, only one set of the collection fins 66 is shown in FIG. 3.

The EBL is added to the boiling side by any of the methods known in the art, such as by applying a slurry, flame spraying, plasma spraying or by electrodeposition; although the methods described here will produce a metallurgical bond between the EBL and the substrate not otherwise resulting with the aforementioned methods. However, it is critical that the subsequent brazing step not diminish the heat exchange efficiency of the EBL once applied. In an embodiment, the melting point of the EBL is higher than the melting point of the brazing metal. The relative melting points of the brazing metal and EBL may be obtained by alloying a second metal with a first metal that has the effect of providing a melting point of the alloy that is lower than the melting point of the first metal. The concentration of the second metal may be higher in the brazing metal than in the EBL material, so that the EBL has a higher melting point that can withstand the brazing step without loss of structural integrity. In brazed aluminum heat exchangers, aluminum is the first metal and silicon, manganese, magnesium or alloys thereof may be the second metal. In brazed steel heat exchangers, nickel may be the first metal and phosphorous may be the second metal. In brazed copper heat exchangers, copper may be the first metal and phosphorous may be the second metal.

In the case of copper being the first metal used to provide the EBL and the brazing material, brazing occurs at about 100° C. (180° F.) below the melting temperature of copper or at about 960° C. (1760° F.). In the case of aluminum being the first metal, brazing occurs at about 49° to 54° C. (120° to 130° F.) below its melting temperature of about 649° C. (1200° F.). If nickel is the first metal, the brazing step in the furnace will take place at a temperature of about 1037° C. (1900° F.) which is 38° C. (100° F.) below the melting temperature of steel. At these temperatures, the second metal lowers the melting point of the alloy with the first metal. The liquefied brazing metal flows and diffuses into the base metal and forms a metallurgical bond. By alloying more of the second metal with the first metal in the braze material than in the EBL material, the EBL once applied will be able to withstand the subsequent lower temperature brazing heat treatment.

It is also contemplated that sintering may be used to form the EBL instead of brazing. In sintering, the metal is heated to the point of molecular agitation and diffuses over a relatively long period of time into an adjacent metal to form metallurgical bonds. Sintering may be used to provide the EBL with brazing at a lower temperature to bond the components of the heat exchanger together.

In an embodiment, the first step of applying the EBL is applying a polymer binder to the boiling side of the metal wall. A metal powder which may comprise the first metal and the second metal are then sprinkled onto the plastic binder. The metal wall with metal powder bound by the plastic thereto is blanketed with an inert atmosphere such as nitrogen and the temperature is raised to a brazing temperature for sufficient time to effect metallurgical bonds between the metal powder particles to each other and to the boiling side of the metal wall. The plastic binder decomposes under heat and evaporates. The circulating inert gas diminishes formation of an oxide film and also purges the decomposition gases from the binder material. The bonded metal powder forms a highly porous, three-dimensional matrix that provides the EBL with nucleate boiling sites.

Appropriate plastic binders include polyisobutylene, polymethylcellulose having a viscosity of at least 4000 cps and sold commercially as METHOCEL and polystyrene having a molecular weight of 90,000. The binder may be dissolved in an appropriate solvent such as kerosene or carbon tetrachloride for polyisobutylene and polymethylcellulose binders and xylene or toluene for polystyrene binder. The boiling side should be cleaned to be free of grease, oil or oxide to obtain proper bonding of the EBL thereto. Before applying the plastic solution, the boiling side may be flushed with the plastic solution to facilitate wetting, thereby obtaining a more even distribution of plastic binder. The plastic solution may be applied to the boiling side in a way that will achieve a uniform layer such as by spraying, dipping, brushing or paint rolling. After application, the layer is air dried either during or after the application of the metal powder to evaporate away most of the solvent. A solid, self-supporting layer of metal powder and binder is left in place on the metal wall by the binder.

The metal powder comprising the first and second metal are mixed with a flux. Upon heating, the flux melts and draws oxides from the metal which could inhibit the bonding of the metal particles to each other and to the boiling side. The flux may be a mineral salt such as commercially available potassium aluminum fluoride, which is a mixture of $KAlF_4$ and $KAlF_6$. Other fluxes may be suitable.

The core 20 of the heat exchanger 10 is assembled by stacking layers of components. If the brazing of the core 20 will not be performed in a vacuum furnace, each component should be coated with flux before stacking A suitable way to coat components with flux components is to mix the flux with denatured alcohol in 1:1 volumetric ratio and brush or spray the flux solution onto the component before stacking. The order of stacking will be described with the side shown in FIGS. 2 and 3 on the bottom. The cap sheet 40 is placed on the bottom of a stacking surface with the outer surface of the cap sheet 40 down. A layer of brazing foil is layered at least on the two vertical margins 48 of an inner surface of the cap sheet 40 or perhaps over the whole inner surface of the cap sheet 40. The vertical spacer bars 42 are stacked on the vertical margins 48 of the inner surface of the cap sheet 40. The brazing foil may be provided only at the vertical margins 48 of the cap sheet 40 because only the vertical spacer bars 42 will be brazed to the inner surface of the cap sheet 40 that is defining the boiling passage 12 in this case. Typically, no horizontal spacer bars 60 are stacked in the boiling passage 12. However, in an embodiment, if the cap sheet 40 is defining the cooling passage 14, the horizontal spacer bars 60 should be stacked on and brazed to the cap sheet 40. A layer of brazing foil is stacked on top of the vertical spacer bars 42. Strips of the brazing foil may be placed just over the vertical spacer bars 42. The metal wall 44 with the EBL 46 on the boiling side 44*a* facing downwardly toward the cap sheet 40 and the cooling side 44*b* facing upwardly is stacked on top of the vertical spacer bars 42. The vertical margins 48 of the boiling side 44*a* which are devoid of the EBL 46 will rest on the brazing foil on top of the vertical spacer bars 42. A layer of brazing foil is laid on top of the cooling side 44*b* of the metal wall 44. The primary fin stock 54 comprising the primary fins 52, the distributor fin stock 58 comprising the distributor fins 56, the collection fin stock 68 comprising the collection fins 66 and the horizontal spacer bars 60 and the vertical spacer bars 42 are all stacked on top of the layer of brazing foil laid on top of the cooling side 44*b* of the metal wall 44. A layer of brazing foil is laid upon the primary fin stock 54, the distributor fin stock 58, the collection fin stock 68 comprising the collection fins 66 and the spacer bars 42, 60. Next, another metal wall 44 with the cooling side 44*b* facing downwardly and the boiling side 44*a* facing upwardly is laid upon the layer of brazing foil. On the top of the metal wall 44, strips of brazing foil are laid down just in the vertical margins 48 of the boiling side 44*a* outside of the EBL 46. The vertical spacer bars 42 are laid down on top of the strips of brazing foil in the vertical margins 48. Strips of brazing foil are laid on top of the vertical spacer bars 42. An additional metal wall 44 with the boiling side 44*a* facing downwardly is stacked on top with the vertical margins 48 mating with the strips of brazing material on top of the vertical spacer bars 42. The rest of the core 20 of the heat exchanger 10 is stacked as previously described until the cap sheet 40 is stacked on the top of the stack. It is also contemplated that both sides of the primary fin stock 54, the spacer bars 42, 60 and/or the cooling side 44*b* of the metal wall 44 may be integrally clad with a layer of brazing material. This would obviate the need for adding layers of brazing foil in the stack constituting the core 20. However, if just the fin stock 54, 58, 68 and/or the spacer bars 42, 60 can be obtained with brazed material clad on both sides, the use of brazing foil may be obviated.

After the core 20 is fully stacked it is inserted into a furnace with an atmosphere of inert gas and heated so that the center 20 of the core attains an elevated temperature. After remaining at the elevated temperature for a period of time, it is allowed to cool. The elevated temperature is above the melting temperature of the brazing material and below the melting temperature of the EBL 46 material upon application and the melting temperature of the base metal. In an embodiment, the elevated temperature may be below the melting temperature of the EBL 46 material after application. In a controlled atmosphere brazing environment, Aluminum Alloy 4047 may be used for the brazing material in which case the elevated brazing temperature would be approximately 607° to about 618° C. (1125° to 1145° F.). Aluminum alloy designations given herein will be pursuant to the convention of alloys used by those of ordinary skill in the art of aluminum brazing. The brazing material melts and forms a metallurgical bond with adjacent metal members to provide a robust metal heat exchanger core. The EBL 46 maintains its highly porous structural integrity. Residues of flux on the surface of the core 20 may remain but will typically wash out without affecting operation.

After brazing the core 20 together, the manifolds 18, 28 and the headers 22, 30 are welded to the core 20 as shown in the embodiment in FIG. 1. The conduits 16, 24, 26, 32 are all affixed to the appropriate manifold 18, 28 or the header 22, 30. Other delivery, distribution, collection and recovery equipment than shown in the embodiment of FIG. 1 may be used within the scope of the present invention.

Alternatively, one or both of the brazing steps may take place in a vacuum oven. Flux becomes unnecessary and a lower temperature is typically used for brazing. However, in the vacuum brazing process, it takes longer for the core to reach the brazing temperature, after which, cooling is allowed. If the stacked core is brazed in a vacuum environment, Aluminum Alloy 4104 may be used for brazing material in which case the elevated brazing temperature would be approximately 582° to about 593° C. (1080° to 1100° F.).

It is important, for purposes of this invention, that the EBL be able to withstand the final brazing heat treatment. In a brazed aluminum heat exchanger, brazing material, whether it be powder, foil or cladding may comprise a eutectic alloy of at least about 80 wt-% aluminum and about 10 to about 15 wt-% silicon. In an embodiment, the eutectic alloy comprises about 11 to about 13 wt-% silicon and at least about 85 wt-% aluminum. In a further embodiment, the brazing eutectic alloy may be Aluminum Alloy 4047 and comprise about 12 wt-% silicon and about 88 wt-% aluminum. Other components of the core 20, such as the walls, the fin stock and the spacer bars may comprise Aluminum Alloy 3003 which comprises a highly proportioned aluminum alloy of as low as about 98 wt-% aluminum and as high as about 2 wt-% manganese. Small amounts of magnesium and iron may also be present in Aluminum Alloy 3003. The term "highly proportioned" means greater than 90 wt-%. Other components comprising substantially pure aluminum or highly proportioned aluminum alloys may be suitable. In vacuum brazing applications, about 1 to 2 wt-% of magnesium may be provided in the highly proportioned aluminum alloy. The material comprising the EBL may comprise about 0.5 to about 1.5 wt-% silicon and at least about 95 wt-% substantially pure aluminum or highly proportioned aluminum alloy. In an embodiment, the EBL may comprise about 5 to about 11 wt-% brazing material and at least about 85 wt-% substantially pure aluminum or highly proportioned aluminum alloy. In an embodiment, the EBL comprises at least about 90 wt-% pure or highly proportioned aluminum and a eutectic alloy including about 11 to about 13 wt-% silicon and at least about 85 wt-% aluminum. In an embodiment, the eutectic alloy in powder form is mixed with powdered substantially pure or highly proportioned aluminum. To prevent oxidation of the aluminum in nonvacuum brazing ovens, a flux comprising about 5 to about 10 wt-% of a powdered mineral salt should be included in the EBL material upon application.

While not wishing to be bound to any particular theory, we believe that upon heating, a powdered EBL material mixture described above, the brazing eutectic alloy powder melts and wets the solid, unmelted substantially aluminum powder, thereby forming an alloy. We believe that after application, the resulting alloy in the EBL melts at a higher temperature than the brazing eutectic alloy by virtue of the lower concentration of the silicon metal in the aluminum alloy. The EBL is then able to withstand brazing temperatures associated with bonding the stacked heat exchanger core that are perilously close to the temperature at which the EBL material was initially brazed without loss of performance.

If the EBL is sintered, pure Aluminum Alloy 3003 powder may be sintered at about 1185° F. (641° C.). Brazing foil comprising the eutectic of silicon and aluminum mentioned above may be used to bond the core together at a brazing temperature of about 604° to 613° C. (1120° to 1135° F.) under a controlled inert atmosphere and a brazing temperature of about 566° to 596° C. (1050° to 1105° F.) in a vacuum environment.

It has been found that based upon the use of a modified vacuum aluminum brazing process thermal cycle in which a temperature plateau at about 500° C. is employed for an extended period of time to effect off-gassing of residual potassium aluminum fluoride brazing flux before elevating the work to the ultimate brazing temperature of 590° to 600° C., good quality braze joints can be obtained where poor brazing would otherwise result using a classical VAB thermal cycle due to interference of the residual potassium aluminum fluoride off-gassing with the braze alloy in the temperature range of brazing. The fact that initiation of off-gassing at 500° C. does not begin until after a considerable period of time is spent at that temperature would not make this an obvious choice to one skilled in the art. Furthermore, the fact that the 500° C. temperature is relatively close to the melting temperature of the braze alloy used for joining the components would further discourage one skilled in the art from considering such an option.

Based on an actual small brazing trial that was conducted, high quality braze joints were obtained in a vacuum aluminum brazing furnace using AA-4004 Si—Al—Mg braze alloy in the boiling passages in combination with the aforementioned modified thermal cycle in which the temperature is first held at a temperature plateau of about 500° C. before being elevated to the ultimate brazing temperature of about 590° to 600° C. In contrast, a similar small brazing trial using a classical thermal cycle typical for vacuum aluminum brazing yielded braze joints of inferior quality and did not produce as good results.

EXAMPLE I

An enhanced boiling powder was obtained by mixing 83.6 wt-% Aluminum Alloy 3003 powder, 8.4 wt-% brazing flux comprising potassium aluminum fluoride and 8.0 wt-% Aluminum Alloy 4047 brazing powder. An adhesive comprising 38 wt-% polyisobutylene sold as CS-200 A3 by Clifton Adhesives and 62 wt-% VARSOL light kerosene solvent was mixed and brushed onto three tubular walls comprising Aluminum Alloy 3003. The enhanced boiling powder was then sprinkled onto the adhesive and heated under nitrogen in a small furnace. Each coated tubular wall was heated to 621° C. (1150° F.) for nine minutes. The adhesive and solvent evaporated off, leaving an EBL of about 0.3 to 0.4 millimeters (10 to 15 mils) thick. The resulting EBL had a highly porous structure and was determined to have boiling heat transfer coefficients above 204,418 kJ/hr/m$^2$K (10,000 BTU/hr/ft$^{2\circ}$ F.).

EXAMPLE II

Two metal tubular walls were coated with the adhesive and the enhanced boiling powder as explained in Example I. Each tubular wall was heated in a controlled nitrogen atmosphere to a brazing temperature of 623° C. (1153° F.) in a closed retort at about atmospheric pressure and then allowed to cool.

A first tubular metal wall was heated and cooled over a period of 48 minutes. The first tubular metal wall was tested and determined to have a heat transfer coefficient of above 204,418 kJ/hr/m$^2$K (10,000 BTU/hr/ft$^2$/° F.), which is more than adequate for a surface with an EBL. The first tubular metal wall was then subjected to a second furnacing to simulate vacuum brazing of an entire heat exchanger core by heating it to a temperature of 593° C. (1100° F.) and allowing it to reside at that temperature over a twenty-four hour period before cooling. Visual inspection revealed that the quality of the EBL was not impacted. The first tubular metal wall was again tested and determined to have a heat transfer coefficient of above 204,418 kJ/hr/m$^2$K (10,000 BTU/hr/ft$^2$/° F.).

A second tubular metal wall was heated and cooled over a period of 36 minutes. The second tubular metal wall was tested and determined to have a heat transfer coefficient of above 204,418 kJ/hr/m$^2$K (10,000 BTU/hr/ft$^2$/° F.), which is adequate for a surface with an EBL. The second tubular metal wall was then subjected to a second furnacing to simulate controlled atmosphere brazing of an entire heat exchanger core by heating it to a temperature of 613° C. (1135° F.) and allowing it to reside at that temperature over a two hour period under nitrogen at atmospheric pressure before cooling. Visual inspection revealed that the quality of the EBL was not impacted. The second tubular metal wall was again tested and determined to have a boiling heat transfer coefficient of above 204,418 kJ/hr/m$^2$K (10,000 BTU/hr/ft$^{2\circ}$ F.). After heating the EBL to a temperature of 8.3 Celsius degrees (15 Fahrenheit degrees) from the brazing temperature of the EBL, the structure of the EBL withstood the heat treatment without noticeable loss to structure or performance.

The invention claimed is:

1. A method of constructing a heat exchanger comprising:
   providing a plurality of metal walls having a boiling side, a cooling side and at least one bonding surface;
   applying thermally conductive particles to a boiling side of a plurality of metal components;
   heating said plurality of metal walls with applied thermally conductive particles to a first temperature to integrally bond said thermally conductive particles together to form an enhanced boiling surface and allowing said plurality of metal walls with the enhanced boiling surface to cool,
   assembling said plurality of metal walls with the enhanced boiling surface with a spacing member so that said boiling sides of said plurality of metal walls with the enhanced boiling surface define a boiling passage and said cooling sides of said plurality of metal walls with the enhanced boiling surface define a cooling passage and providing layers of metal between said bonding surfaces of said plurality of metal walls with the enhanced boiling surface and adjacent surfaces of the spacing member; and
   heating the assembly in a vacuum furnace using a vacuum aluminum brazing process to a second temperature that is less than said first temperature, said second temperature being about 500° C., and maintaining said second temperature for an extended period of time to off-gas residual amounts of said thermally conductive particles and then heating the assembly to a third temperature that is about 100° C. greater than said second temperature and less than said first temperature to bond the layers of metal to at least one of the adjacent surfaces of the spacing member and the bonding surfaces of the plurality of metal walls with the enhanced boiling surface.

2. The method of claim 1 further comprising:

affixing a boiling header to the heat exchanger to be in fluid communication with an inlet to said boiling passages;

affixing a cooling header to said heat exchanger to be in fluid communication with an inlet to said cooling passages;

affixing a boiling manifold to said heat exchanger to be in fluid communication with an outlet of said boiling passages; and affixing a cooling manifold to said heat exchanger to be in fluid communication with an outlet of said cooling passages.

3. The method of claim 1 wherein said third temperature is about 590° to 600° C.

4. The method of claim 1 wherein said heat exchanger comprises:

a plurality of metal walls, each metal wall comprising two sides, a boiling side with an enhanced boiling layer comprising thermally conductive particles integrally bonded together and a cooling side, said boiling side of said plurality of metal walls defining a boiling passage and said cooling side of said plurality of metal walls defining a cooling passage and each of said plurality of metal walls further including a bonding surface;

a spacer member for spacing metal walls from each other;

a layer of metal between said bonding surfaces of said metal walls and said spacer member in said heat exchanger, said layer of metal having a melting temperature that is less than a melting temperature of said enhanced boiling layer;

a boiling inlet for delivering liquid to said boiling passage;

a cooling inlet for delivering fluid to said cooling passage;

a boiling outlet for recovering vapor from said boiling passage; and a cooling outlet for recovering fluid from said cooling passage.

5. The method of claim 4 wherein the metal walls predominantly comprise aluminum.

6. The method of claim 4 wherein the thermally conductive particles predominantly comprise aluminum.

7. The method of claim 4 wherein said enhanced boiling layer includes between about 0.5 and about 1.5 wt-% silicon.

8. The method of claim 4 wherein said enhanced boiling layer comprises a highly proportioned aluminum alloy powder mixed with a eutectic alloy of aluminum and silicon.

9. The method of claim 8 wherein the highly proportioned aluminum alloy comprises 92 wt-% of the enhanced boiling layer and the eutectic alloy comprises 8 wt-% of the enhanced boiling layer.

10. The method of claim 4 wherein said layer of metal comprises said eutectic alloy.

11. The method of claim 8 wherein the eutectic alloy is 12 wt-% silicon and 88 wt-% aluminum.

\* \* \* \* \*